J. M. LONG.

Horse Rake.

No. 70,008.

Patented Oct. 22, 1867.

Witnesses:
Theo Frische
Fred B Miles

Inventor:
John M Long
Per Munn & Co
Attorneys.

UNITED STATES PATENT OFFICE.

JOHN M. LONG, OF HAMILTON, OHIO.

IMPROVEMENT IN HORSE-RAKES.

Specification forming part of Letters Patent No. 70,008, dated October 22, 1867.

*To all whom it may concern:*

Be it known that I, JOHN M. LONG, of Hamilton, in the county of Butler and State of Ohio, have invented a new and useful Improvement in Rakes; and I do hereby declare that the following is a full, clear, and exact description thereof, which will enable others skilled in the art to make and use the same, reference being had to the accompanying drawings, forming part of this specification, in which—

Figure 1:
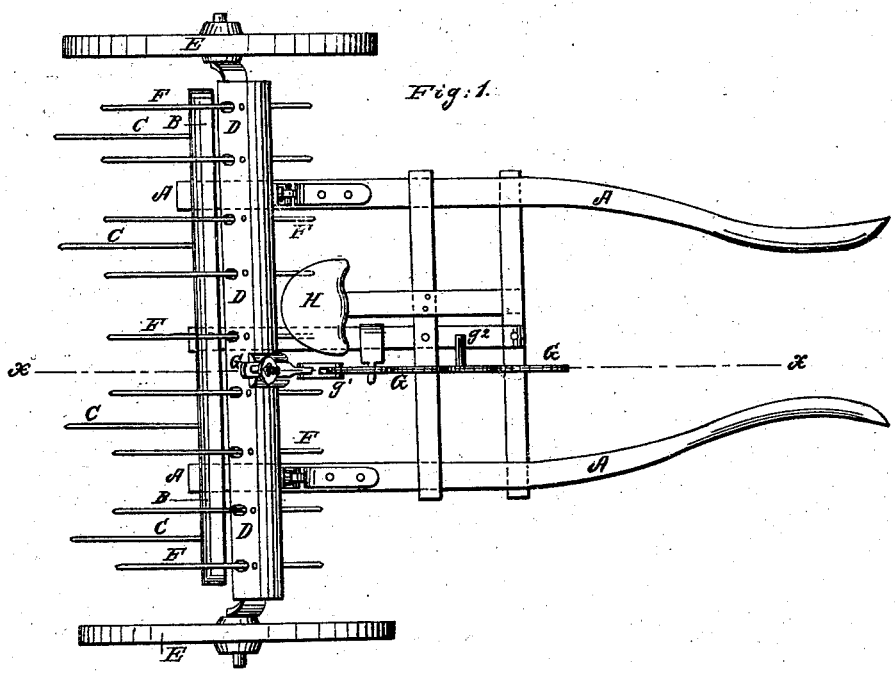
Figure 2:
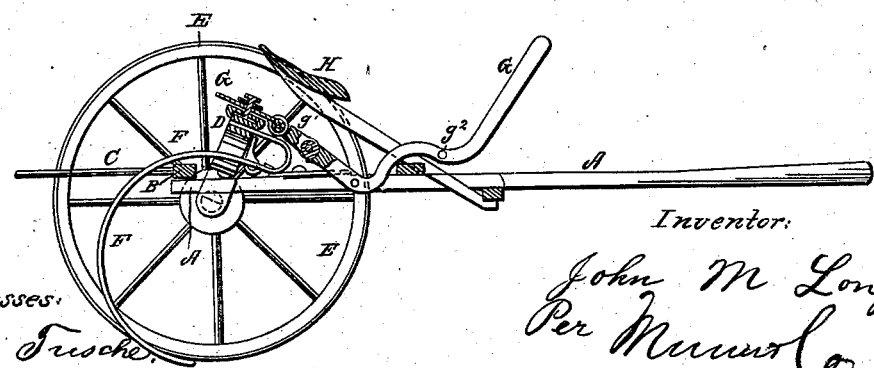

Figure 1 is a top or plan view of my improved rake. Fig. 2 is a vertical section of the same, taken through the line $x\,x$, Fig. 1.

Similar letters of reference indicate like parts.

My invention has for its object to furnish an improved rake so constructed and arranged that the weight of the driver may cause the rake to act promptly when unloading, and so that when the rake-teeth revolve up to unload, the shafts and the fingers may go down, disengaging the rake-teeth from the collected hay in much less time than can be done with other rakes; and it consists in the form of the rake-teeth and in the manner of attaching them to the axle, in the jointed lock-lever, in combination with the axle and shaft-frame, and in hinging the shafts to the lower edge of the forward part of the axle, the whole being constructed and arranged as hereinafter more fully described.

A are the shafts, to the rear ends of which is attached a cross-bar, B, having fingers C attached to it, which project rearward to assist in detaching the collected hay from the rake-teeth.

D is the axle, to which the wheels E are attached in the ordinary manner, and which is hinged to the shafts A at the lower edge of its forward side, as shown in Figs. 1 and 2, so that the weight of the driver will draw the axle forward or downward to raise the teeth, while at the same time the shafts and fingers are forced down to assist in disengaging the teeth from the collected hay.

F are the teeth, the upper ends of which are passed through the axle D from front to rear and riveted down, or otherwise secured in place. The teeth are then bent, as shown in Fig. 2, and passed back through slots in the axle D. The lower part of the teeth E is bent into the usual form. This manner of forming and attaching the teeth allows them to have sufficient play and elasticity to accommodate themselves to inequalities in the surface of the ground, or to pass over obstructions, the slots in the axle D at the same time acting as guides to the teeth and guarding them against lateral displacement.

G is the lock-lever, the rear end of which is secured to the axle D by a bolt passing through a slot in its rear end and through or into the axle.

$g'$ is a link or double joint in the rear part of the said lever, as shown in Figs. 1 and 2. The middle part of the lever G is pivoted to the shaft-frame, and its forward end projects forward and upward into such a position as to be readily reached and operated by the driver from his seat.

$g^2$ is a pin projecting from the side of the lever G in front of its fulcrum, so that the driver can easily hold the lever locked with his foot. By this construction, when the lever is in the position shown in Fig. 2 no strain applied to the teeth F can unlock the lever or revolve the axle; but when the forward end of the lever is drawn a little back, so as to throw the joints of the lever out of line, the weight of the driver immediately draws the axle D forward and downward, raising the teeth F, and at the same time the fingers C move downward, discharging the collected hay much sooner than it could be done by revolving the teeth away from it.

H is the driver's seat, which is attached to and supported by the shaft-frame, as shown in Figs. 1 and 2.

What I claim as new, and desire to secure by Letters Patent, is—

1. The rake-teeth F, constructed and attached to the axle D substantially in the manner herein shown and described.

2. The arrangement of the shafts A, slotted axle D, bar B, clearers C, lever G, and teeth F, as herein described, for the purpose specified.

The above specification of my invention signed by me this 30th day of March, 1867.

JOHN M. LONG.

Witnesses:
JOHN KECK,
DOMINICK BLACK.